3,300,540
PREPARATION OF ALLENES
Donald B. Miller, Ponca City, Okla., assignor to Continental Oil Company, Ponca City, Okla., a corporation of Delaware
No Drawing. Filed Apr. 8, 1964, Ser. No. 358,364
16 Claims. (Cl. 260—680)

This invention relates to allenes (1,2-dienes) and to a process for their preparation.

Various allenes have been prepared by the reaction of Gringnard reagents ($RM_gX$) and propargyl bromide; this reaction produces a mixture of allene $$(RCH=C=CH_2)$$

and acetylene ($RCH_2C\equiv CH$). Allenes have also been prepared by the reduction of propargylic halides with complex hydrides such as $LiAlH_4$; this procedure requires the synthesis of propargylic halide of the desired carbon skeleton structure before the reduction can be carried out.

An object of the invention is a process for the preparation of allenes. Another object of the invention is a process for the preparation of allenes using propargylic halide, which process produces substantially no acetylenic product. A further object of the invention is such a process which does not require the use of a propargylic halide reactant having the carbon skeleton structure of the desired allene. Other objects will become apparent in the detailed description of the invention.

It has been discovered that an allene is a product of the reaction of a haloaliphatic compound having at least three carbon atoms, an acetylenic bond at the 1 position, and a halogen at the 3 position, and an organo-aluminum compound having 3 organo groups. Preferably the reactants are charged in at least about an equimolar ratio of the organo-aluminum compound to the haloaliphatic compound. The reaction may be carried out in the presence of an inert solvent for the reactants.

The process of the invention involves the reaction of a haloacetylenic compound and a tri-organo-aluminum compound to form free allene, and apparently di-organo-aluminum halide. For convenient recovery of the allene product, it is preferred to hydrolyze the reaction product mixture, separate the liquid material and distillatively recover the allene product.

Any haloaliphatic compound having at least three carbon atoms, an acetylenic bond at the 1 position, and a halogen at the 3 position may be charged to the process, i.e. $CH\equiv C-CR_2X$ where X is halogen such as fluoro, chloro, bromo and iodo, and R is either hydrogen or other non-reactive substituent. More than one acetylenic bond may be present. The compound may include substituents which do not deactivate the reactants. Illustrative substituents are alkyl, alkenyl, phenyl, nitro and carboxy.

It is preferred to use a haloalkyne having at least 3 carbon atoms, an acetylenic bond at the 1 position and a halogen at the 3 position, e.g. 3-halo-1-alkyne. In general, these haloalkynes have 3–30 carbon atoms or more. The products from haloalkynes having 3–12 carbon atoms are of especial commercial interest. Propargyl chloride (3-chloro-1-propyne) is an especially suitable reactant because of its availability.

The other reactant in the process of the invention is organo-aluminum having 3 organo groups, i.e., $AlR_3$. It is preferred to use a pure compound as it appears that the presence of organo aluminum hydride, $AlR_2H$, causes the formation of monoolefinic product rather than the desired allene product.

The organo group may be any group which does not deactivate the reactants. It is preferred to use a hydrocarbon-aluminum compound having 3 hydrocarbon groups. These hydrocarbon groups may be alkyl, cycloalkyl, aryl, aralkyl and cycloalkyl-alkyl. Especially preferred are the trialkyl aluminum compounds having 1–20 carbon atoms in each alkyl group and more usually 2–12 carbon atoms in each alkyl group. Illustrative are triethyl aluminum; tri-n-butyl aluminum; triisobutyl aluminum; and tri-n-dodecyl aluminum.

Allene will be produced when an appreciable amount of either reactant is present. However, it is desirable to charge the reactants in at least about an equimolar ratio of the aluminum compound reactant to the halo compound reactant. It is preferred to operate with an excess of the aluminum compound reactant, generally about a 5–50 mole percent excess.

The reaction may be carried out in the presence of an inert liquid solvent for the reactants. Preferred solvents are liquid hydrocarbons, such as paraffins, cyclo paraffins and benzene hydrocarbons. When a solvent is present, it should be readily separable from the allene product by distillation.

It is to be understood that, just as in all reactions involving organo-aluminum compounds, precautions must be taken to avoid entry into the reaction zone of deactivating materials such as water and oxygen.

The reaction may be carried out at any temperature below the decomposition point of the organo-aluminum compound re-actant or the explosive limit of the haloacetylenic compound. In general, temperatures between about 0°–100° C. are suitable; more commonly, temperatures of 20°–30° C. are used.

Reaction time is dependent on the temperature of the reaction zone and also on the degree of conversion of the haloacetylenic reactant. It is preferred to continue the reaction until all of the haloacetylenic compound has been converted.

The reaction product mixture comprises allene product, solvent (if used), unreacted organo-aluminum and haloacetylenic compound, and apparently di-organo-aluminum halide. The allene may be recovered from the reaction product mixture. Generally, it is more convenient to hydrolyze the organo-aluminum compounds, decant the liquid materials including the allene product, and then distillatively recover the allene product.

The allenes because of the 1,2 double bond orientation are of interest in the production of elastomers and of especial interest in the production of copolymers having special properties.

ILLUSTRATIONS

The process of the invention is illustrated by the following working examples. It is to be understood that the scope of the invention is not limited by these examples.

*Example 1—1,2-pentadiene*

Triethylaluminum (82 ml., 0.6 mole) and butyl ether (26 g., 0.2 mole) were placed in a rubber capped onequart beverage bottle with heptane (250 ml.). The bottle was evacuated with house vacuum, pressured to 30 p.s.i.g. with ethylene and then heated at 70° C. for two days. After the ethylene was vented, propargyl chloride (29.9 g., 0.4 mole) was added; the bottle was again evacuated and left at room temperature. After about half an hour, the bottle had become quite warm (60° C.) but in another half hour, the bottle had returned to near room temperature. After one day, NMR analysis of the reaction mixture showed that the propargyl chloride had essentially all reacted and that considerable 1,2-pentadiene was now present.

The reaction mixture was hydrolyzed by cautiously adding it to cold dilute hydrochloric acid. A water-cooled condenser and a Dry Ice-cooled trap were used to retain the volatile, but condensable hydrolysis products. The organic portion of the hydrolysate was distilled to give 16.3 g. product (6 fractions) boiling 40–45° C. which contained 84% 1,2-pentadiene (13.7 g., 0.20 mole, 50%), identified by its mass (molecular ion peak at mass 68), infrared (C=C=CH$_2$ band at 1970 cm.$^{-1}$), and NMR (1.9 primary vinyl H signal, 1.0 secondary vinyl H signal, 1.9 allylic methylene H signal and 3.3 methyl H signal) spectra. The last and purest fraction contained 97.8 pentadiene.

The product also contained 2.5% (0.4 g., 59 mmoles, 1.5%) of a component with a V.P.C. retention time identical to that of 1-pentyne. The supposed 1-pentyne was not detected when the mixture was analyzed on a V.P.C. column containing silver nitrate.

No more than a trace of 1-pentene was found in the product.

*Example II—1,2-pentadiene*

Dry xylene (50 ml.) was placed in a 200 ml. beverage bottle capped with a rubber septum. Then triethylaluminum (10 ml., 73 mmoles) and propargyl chloride (5 g., 68 mmoles) were added. After 10 days at room temperature, the now rather dark mixture was hydrolyzed by adding it cautiously to dilute hydrochloric acid. After hydrolysis, the organic layer was distilled to give 1.0 g. product (apparent B.P. 38°) which was 95.3% a single component (GLPC analysis). NMR, IR and mass analysis showed that the predominant product is 1,2-pentadiene.

Butane (2.6%), 1-pentene (1.5%) and an unidentified component (0.7%) constituted the main impurities (GLPC).

1-pentyne was not present in detectable amounts.

*Example III—1,2-heptadiene*

Tributylaluminum, (17 ml., 70 mmoles) and propargyl chloride (5.0 g., 68 mmoles) were added to a septum-capped 200 ml. beverage bottle containing 30 ml. of dry xylene. After two days at room temperature, the mixture was hydrolyzed by adding cautiously to dilute hydrochloric acid.

Distillation of the organic layer gave 4.4 g., of product boiling at 96–122° (mostly 96–101°) which by V.P.C. analysis was 88% 1,2-heptadiene (3.9 g., 40 mmoles, 59%). No more than a trace of 1-heptyne was detected. The pricipal impurities were 1-heptene (0.1 g., 1 mmole, 1.5%) and butane (5%).

1,2-heptadiene was identified by its mass (molecular ion peak at mass 96) and NMR (3.4 methyl H signal, 5.9 total methylene H signal, 1.0 secondary vinyl H signal and a 1.8 primary vinyl H signal) spectra, and by comparison of its infrared spectrum with a published spectrum of 1,2-heptadiene.

*Example IV—5-methyl-1,2-hexadiene*

By the procedure given above, propargyl chloride (5.0 g., 68 mmoles) and triisobutylaluminum (18 ml., 70 mmoles) were reacted at room temperature in 30 ml. of dry xylene, hydrolyzed after two days with hydrochloric acid, and the organic product distilled to give fraction A (1.6 g.) boiling up to 91°, and fraction B (1.7 g.) boiling 91–95°.

Fraction B contained 86% of a single component, identified by its mass (molecular ion peak as mass 96), infrared (C=C=CH$_2$ band at 1958 cm.$^{-1}$; CH$_3$CCH$_3$ bands at 1383 cm.$^{-1}$ and 1365 cm.$^{-1}$) and NMR (6.2 methyl H signal, 3.1 methylene plus tert-H signal, 0.9 secondary vinyl H signal and 2.3 primary vinyl H signal) spectra as 5-methyl-1,2-hexadiene, and 6.5% of a substance not identified, but believed from its V.P.C. behavior to be 5-methyl-1-hexene (no standard was available).

Fraction A contained 47% 5-methyl-1,2-hexadiene (total 2.3 g., 24 mmoles, 35%) and 44% of the supposed 5-methyl-1-hexene (total 0.8 g., 8.0 mmoles, 12%).

A trace component with a V.P.C. retention time slightly greater than the diene is believed to be 5-methyl-1-hexyne.

Thus having described the invention, what is claimed is:

1. A process for the preparation of an allene which process comprises:
   reacting a haloaliphatic compound having at least 3 carbon atoms, an acetylenic bond at the 1 position and a halogen at the 3-position; and a hydrocarbon-aluminum compound having 3 hydrocarbon groups.

2. The process of claim 1 wherein said reaction is carried out in the presence of an inert liquid solvent for said reactants.

3. The process of claim 1 wherein said reactants are charged in at least about an equimolar ratio of said hydrocarbon-aluminum compound to said halo compound.

4. A process for the preparation of an allene which process comprises:
   reacting a haloalkyne having at least 3 carbon atoms, an acetylenic bond at the 1 position and a halogen at the 3 position, and
   a hydrocarbon-aluminum compound having 3 hydrocarbon groups;
   at a temperature between about 0°–100° C.

5. The process of claim 4 wherein said reactants are charged in at least about an equimolar ratio of said hydrocarbon-aluminum compound to said halo compound.

6. The process of claim 4 wherein said alkyne is 3-halo-1-alkyne having 3–30 carbon atoms.

7. The process of claim 6 wherein said alkyne is propargyl chloride.

8. The process of claim 4 wherein said aluminum compound is trialkyl aluminum.

9. The process of claim 8 wherein said trialkyl aluminum is triethyl aluminum.

10. The process of claim 8 wherein said trialkyl aluminum is tri-n-butyl aluminum.

11. The process of claim 8 wherein said trialkyl aluminum is triisobutyl aluminum.

12. The process of claim 4 wherein said reaction is carried out in the presence of an inert solvent for said reactants.

13. The process of claim 12 wherein said solvent is a liquid hydrocarbon.

14. The process of claim 13 wherein said solvent is xylene.

15. A process for preparing 1,2-pentadiene which process comprises:
   reacting propargyl chloride and triethyl aluminum in at least about an equimolar ratio of aluminum to chloride;
   in the presence of an inert liquid hydrocarbon solvent for said reactants;
   at a temperature of about 20°–30° C.;
   for a time such that essentially all of said chloride has reacted; and
   hydrolyzing the reaction product mixture to recover a hydrolysate including product 1,2-pentadiene.

16. A process for preparing 1,2-heptadiene which process comprises:

reacting propargyl chloride and tri-n-butyl aluminum in at least about an equimolar ratio of aluminum to chloride;
in the presence of an inert liquid hydrocarbon solvent for said reactants;
at a temperature of about 20°–30° C.;
for a time such that essentially all of said chloride has reacted; and
hydrolyzing the reaction product mixture to recover a hydrolysate including product 1,2-heptadiene.

References Cited by the Examiner

Serratosa, Tetrahedron Letters 1964 (15–16), pp. 895–900.

References Cited by the Applicant

UNITED STATES PATENTS

| | | |
|---|---|---|
| 2,072,867 | 3/1937 | Carothers. |
| 2,366,311 | 1/1945 | Breuer. |
| 3,096,384 | 7/1963 | Logan. |

DELBERT E. GANTZ, *Primary Examiner.*
G. E. SCHMITKONS, *Assistant Examiner.*